US009187624B2

(12) United States Patent
Lu et al.

(10) Patent No.: US 9,187,624 B2
(45) Date of Patent: Nov. 17, 2015

(54) HEMP FIBER REINFORCED COMPOSITE WITH RECYCLED HIGH DENSITY POLYETHYLENE AND PRODUCTION THEREOF

(75) Inventors: Na Lu, Charlotte, NC (US); Ralph Robert Johnson, Charlotte, NC (US)

(73) Assignee: The University of North Carolina at Charlotte, Charlotte, NC (US)

(*) Notice: Subject to any disclaimer, the term of this patent is extended or adjusted under 35 U.S.C. 154(b) by 291 days.

(21) Appl. No.: 13/213,664

(22) Filed: Aug. 19, 2011

(65) Prior Publication Data

US 2012/0046394 A1 Feb. 23, 2012

Related U.S. Application Data

(60) Provisional application No. 61/375,331, filed on Aug. 20, 2010, provisional application No. 61/386,706, filed on Sep. 27, 2010.

(51) Int. Cl.
| | |
|---|---|
| *C08L 97/02* | (2006.01) |
| *C08K 7/02* | (2006.01) |
| *C08J 5/04* | (2006.01) |
| *B29C 70/48* | (2006.01) |
| *B29C 70/52* | (2006.01) |
| *B29C 70/44* | (2006.01) |
| *B29C 70/50* | (2006.01) |
| *B29C 67/00* | (2006.01) |
| *B29K 23/00* | (2006.01) |

(Continued)

(52) U.S. Cl.
CPC .............. *C08K 7/02* (2013.01); *B29C 67/0062* (2013.01); *B29C 70/443* (2013.01); *B29C 70/48* (2013.01); *B29C 70/506* (2013.01); *B29C 70/52* (2013.01); *C08J 5/045* (2013.01); *C08L 97/02* (2013.01); *B29K 2023/065* (2013.01); *B29K 2105/10* (2013.01); *B29K 2105/26* (2013.01); *B29K 2267/046* (2013.01); *B29K 2311/10* (2013.01); *C08J 2323/06* (2013.01); *C08J 2397/02* (2013.01); *Y10T 428/249942* (2015.04)

(58) Field of Classification Search
USPC ................................................ 264/103; 524/9
See application file for complete search history.

(56) References Cited

U.S. PATENT DOCUMENTS 5,278,282 A * 1/1994 Nauman et al. ............... 528/497

FOREIGN PATENT DOCUMENTS

DE 19934377 A1 * 1/2001

OTHER PUBLICATIONS

Beckermann, G., "Performance of help-fibre reinforced polypropylene composite materials," Ph.D. Thesis. University of Waikato. Dec. 2007.*

(Continued)

*Primary Examiner* — Liam J Heincer
*Assistant Examiner* — Nicholas Hill
(74) *Attorney, Agent, or Firm* — Pike IP Law, PLLC; Bernard G. Pike

(57) ABSTRACT

Novel structural materials composed of industrial hemp fiber with recycled high density polyethylene (HDPE) as well as methods for the production of the same are disclosed. The material's mechanical strength outperforms that of conventional lumber and could compete with glass fiber reinforced composites, particularly in tensile strength. In addition, this material offers many other significant advantages including insect free, high moisture resistance, no harmful chemical treatments, and no rapid corrosion in water environments.

13 Claims, 15 Drawing Sheets

(51) Int. Cl.
  *B29K 105/10*  (2006.01)
  *B29K 105/26*  (2006.01)
  *B29K 311/10*  (2006.01)

(56) References Cited

OTHER PUBLICATIONS

Lei, Y., et al., "Preparation and properties of recycled HDPE/natural fiber composites," 2007, Composites: Part A, 38, 1664-1674.*
GUduri, B. R., et al., "The effect of water absorption on mechanical properties of hemp fibre/polyolefin composites," Dec. 2007. Fibre Re-inforced Composites Conference, Port Elizabeth, South Africa.*
Nakamura, H., et al., "Effect of surface treatment on the mechanical properties of biocomposites," Jul. 2009. Seventeeth International Conference on Composite Materials, Edinburgh, Scotland.*
Gabriel, L. H. "History and physical chemistry of HDPE," downloaded from www.plasticpipe.org on Apr. 2, 2012.*
Hemp fibres for green products—an assessment of life cycles studies on hemp fibre applications. European industrial hemp association report. Jun. 2011.*
Shikamoto et al., "Fabrication and mechanical properties of jute/PLA composites," 22nd Technical Conference of the American Society for Composites, 2007, 151:1-151:10.*
Machine translation of DE19934377, Espacenet, Apr. 2013.*
Herrera-Franco, P. J., et al., "Mechanical properties of continuous natural fibre-reinforced polymer composites," Composites: Part A, 2004, 339-345.*
Achilias, D. S., et al., "Chemical recycling of plastic wastes made from polyethylene (LDPE and HDPE) and polypropylene (PP)," J. Hazardous Mat., 2007, 149, 536-542.*
Wolf, B., et al. "Solubility of Polymers," Encyclopedia of POlymer Science and Technology, 2011.*
Kuhn, Howard Medlin, Dana (2000). ASM Handbook, vol. 08—Mechanical Testing and Evaluation. ASM International. Table 4.*

* cited by examiner

HEMP FIBER REINFORCED COMPOSITE WITH RECYCLED HIGH DENSITY POLYETHYLENE AND PRODUCTION THEREOF

RELATED APPLICATIONS

This U.S. nonprovisional patent application claims priority under 35 U.S.C. §119 to U.S. Provisional Patent Application No. 61/375,331 filed on Aug. 20, 2010 and to U.S. Provisional Patent Application No. 61/386,706 filed on Sep. 27, 2010.

GOVERNMENT SUPPORT

This invention was made with Government support under award number 0548401 by the National Science Foundation. The Government has certain rights in the invention.

BACKGROUND

The use of high density polyethylene (HDPE) continues to grow in the United States and abroad. HDPE is used for the production of consumer articles including, but not limited to, liquid containers such as juice, milk and water bottles, laundry detergent bottles, and toys, for example. Milk bottles and other hollow goods manufactured through blow molding are the most important application area for HDPE—More than 8 million tons, or nearly one third of worldwide production, was applied here. Above all, China, where beverage bottles made from HDPE were first imported in 2005, is a growing market for rigid HDPE packaging, as a result of its improving standard of living. In India and other highly populated, emerging nations, infrastructure expansion includes the deployment of pipes and cable insulation made from HDPE. The material has benefited from discussions about possible health and environmental problems caused by PVC and Polycarbonate associated Bisphenol A, as well as, its advantages over glass, metal and cardboard One third of all toys are manufactured from this thermoplast. Less often seen, but nevertheless vital goods produced from HDPE include water pipes, gas mains, oil tanks, and geomembranes. The lightweight, non-toxic material is easily recyclable and is increasingly being utilized as an alternative for less environmentally friendly substances.

Another application for HDPE is wood plastic composites, composite wood and plastic building materials to replace wood, concrete and metal components. Recycled plastics may be used to produce these materials. HDPE is also widely used in the pyrotechnics trade. HDPE mortars are preferred to steel or PVC tubes because they are more durable and more importantly they are much safer compared to steel or PVC. If a shell or salute were to malfunction (flowerpot) in the mortar, HDPE tends to rip and tear instead of shattering into sharp pieces which can kill or maim onlookers. PVC and steel are particularly prone to this and their use is avoided where possible.

Recently, the global HDPE market for HDPE reached a volume of more than 30 million tons, up from 22 million tons in the year 2000. There is therefore a strong need in the market for new uses of the growing amounts of used HDPE and new materials made from recycled HDPE. There is also a strong need in for new building materials with increased strength and resistance to water and insect damage.

BRIEF SUMMARY OF THE INVENTION

The present invention is directed to a novel structural material comprising hemp fiber with (HDPE) as well as methods for the large scale production of the same. The HDPE may be recycled HDPE. The composite material's mechanical strength outperforms that of conventional lumber and could compete with glass fiber reinforced composites, particularly in tensile strength. In addition, this material offers many other significant advantages including insect free, high moisture resistance, no harmful chemical treatments, and no rapid corrosion in water environments.

Embodiments of hemp fiber composites with recycled high density polyethylene matrix were prepared in various compositions ranging from 20 to 40% of fiber volume fraction. The fiber-matrix interface was improved by treating the hemp fiber with NaOH prior to producing the composite. The hemp fiber-recycled high density polyethylene (rHDPE) composites achieved maximum tensile strengths on the order of 60 MPa. Among the tested samples, the composites with 40% of fiber volume fraction demonstrated the best mechanical properties with regards to tensile strength, elastic modulus, and flexural strength and modulus.

Hemp fiber composites with rHDPE were manufactured by using extrusion, pultrusion, vacuum assisted infusion, and compression molding process techniques. Prior to composite fabrication, the natural hemp fibers were treated with a NaOH solution. The effect of alkali treatment was investigated by FTIR and SEM. FTIR results indicated that there is an increase in the percentage of —OH groups, which may provide more reaction sites for fiber-matrix adhesion. Therefore, the interfacial adhesion between the fiber-matrix may possibly be increased. Pectin, wax and lignin were completely removed from hemp fiber surface, which resulted in large surface area and improved surface roughness. The FTIR also indicated that the hemicelluloses group was partially removed. SEM images of treated hemp fiber support the conclusions from FTIR results. SEM images of fracture surface of hemp fiber composites showed clearly improved interfacial adhesion between the hemp fiber and polymer matrix. The resultant composites have demonstrated promising mechanical properties with regard to their tensile strength, tensile modulus and strain at maximum strength, flexural strength and modulus for each hemp fiber composite which has been studied. Based on these reported experimental results, the hemp fiber-rHDPE composites with 40% fiber volume fraction yielded very promising results of tensile strength and modulus, and flexural strength and modulus of 60.2 MPa, 2575 MPa, 44.6 MPa and 2429 MPa (at 1% strain) respectively. The resultant composite have a good potential for light load applications in civil infrastructure industry, for instance short-span bridges and hurricane proof panels.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

DESCRIPTION OF EMBODIMENTS

The composite will be described more fully hereinafter by describing embodiments of the composite material, in which some, but not all embodiments of the composite materials are described. Indeed, this invention may be embodied in many different forms and should not be construed as limited to the embodiments set forth herein; rather, these embodiments are provided so that this disclosure will satisfy applicable legal requirements.

The invention is directed to composite materials. Embodiments of a composite material comprise hemp fibers embedded in a matrix of high density polyethylene. The hemp fibers reinforce the matrix such that an article made from the composite has a greater tensile strength than an article made from the high density polyethylene alone. For example, embodiments of the composite material may have a tensile strength of greater than 40 MPa, further embodiments of the invention may have a tensile strength of greater than 40 MPa, and still further embodiments of the invention may have a tensile strength of greater than 60 MPa. The increase in tensile strength may be due to pretreatment of the hemp fibers prior to incorporation into a matrix of high density polyethylene.

Figure 1:
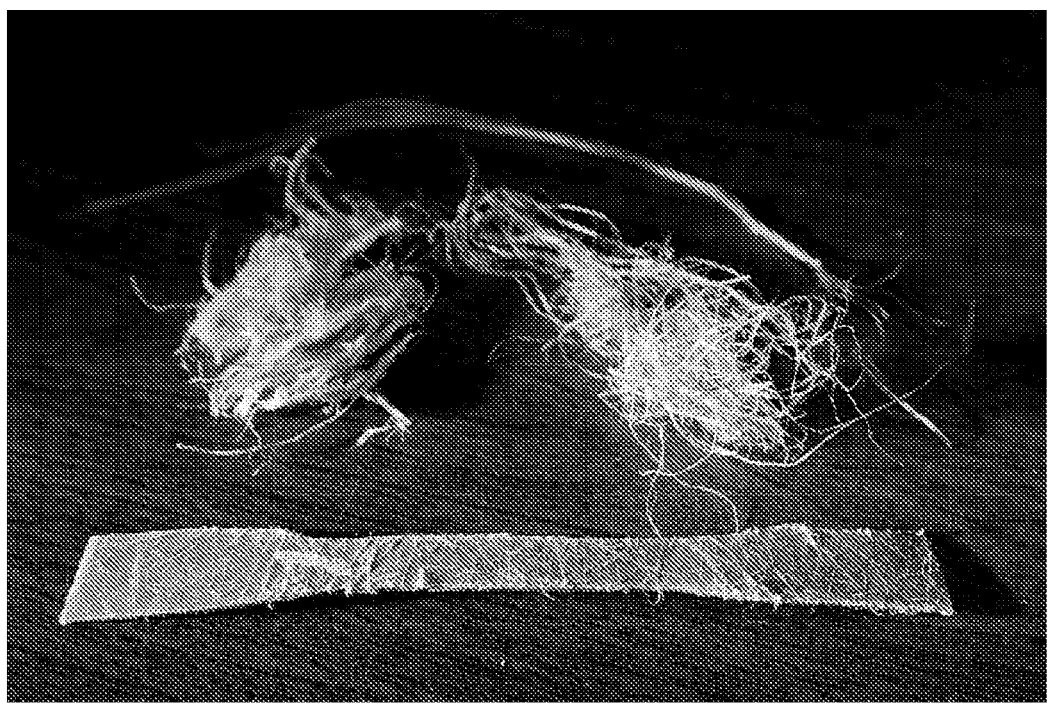
FIG. 1 is a photograph of a testing sample of the composite material comprising hemp fibers embedded in a matrix of recycled high density polyethylene, the composite material is in the shape of a "Dog Bone" conforming to ASTM D 3039 Standard for tensile testing.

"Hemp fibers" or "hemp" are durable fibers that are harvested from plants of the *Cannabis* genus, for example. The term "hemp" may also be used to identify the entire plant from which hemp fibers are derived. The hemp fibers are considered to be the most commercially valuable part of the hemp plant. Bast fibers give the plants its strength. The term "bast fibers" refers to the fibers that grow on the outside of the woody interior of the plant's stalk and under the bark. Examples of hemp fibers are shown in FIG. 1. In the hemp plant, bast fibers grow to be approximately 3 feet to 15 feet long and are used for industrial purposes including paper, textiles, biodegradable plastics, construction, health food and fuel with modest commercial success.

Hemp is an important source of fibers because it is one of the faster growing biomasses. For example, hemp farming may produce up to 25 tons of dry matter per hectare per year. The dry matter includes, approximately, one ton of hemp bast fiber per 3-4 tons of the dry retted hemp straw.

*Cannabis sativa* L. subsp. *sativa* var. *sativa* is the variety of hemp plant grown for industrial hemp production. Another variety, *Canabis sativa* subsp. indica, has poor fiber quality and is primarily used for production of recreational and medicinal drugs.

The chemical composition of natural fibers consists essentially of cellulose (microfiber of the cell wall), hemicelluloses, and lignin (biopolymer components of the cell wall). The outer surfaces of plant fiber contain waxes, fats, and pectin. The cellulose group is a highly crystalline structure with theoretical Young's modulus of ~130 GPa; therefore many natural fibers exhibit good mechanical properties. In particular, hemp, flax, and kenaf have remarkable mechanical properties, with a comparable specific strength but higher specific modulus than E-glass fiber, as presented in Table 1.

TABLE 1

Typical Mechanical Properties of Cellulose Fiber vs. E-glass Fiber

| Material | Density (g/cc) | Tensile Strength (MPa) | Elastic Modulus (GPa) | Specific Strength ($\sigma/\gamma$) | Specific Modulus ($\epsilon/\gamma$) | Elongation at failure (%) | Moisture Absorption (%) | 2011 Cost ($/lb) |
|---|---|---|---|---|---|---|---|---|
| E-glass | 2.62 | 3400 | 73 | 1297 | 28 | 4.8 | N/A | 1.10 |
| Hemp | 1.4 | 550-900 | 70 | 393-643 | 50 | 1.6 | 6-12 | 0.30 |
| Flax | 1.4 | 800-1500 | 60-80 | 571-1071 | 43-57 | 2.7-3.2 | 8-12 | 0.33 |
| Ramie | 1.5 | 500 | 44 | 333 | 29 | 3.6-3.8 | 8-17 | 0.34 |
| Kenaf | 1.45 | 930 | 53 | 641 | 36 | 1.6 | 10-12 | 0.24 |
| Coir | 1.25 | 220 | 6 | 176 | 5 | 1.5-4 | 8 | 0.20 |
| Sisal | 1.33 | 600-700 | 38 | 451-526 | 29 | 3-7 | 10-22 | 0.36 |
| Jute | 1.46 | 400-800 | 10-30 | 281-548 | 7-21 | 1.5 | 12-14 | 0.20 |

The composite materials comprise high density polyethylene. The high density polyethylene may be a recycled high density polyethylene (rHDPE). As used herein, "recycled high density polyethylene" is high density polyethylene that has been manufactured from used products or waste materials comprising high density polyethylene. The used or waste material may be reprocessed to produce the recycled high density polyethylene. Typical reprocessing steps for recycling high density polyethylene include, but are not limited to, cleaning the used or waste material, segregating and/or sorting of the plastic according to resin content and/or color, shredding or chopping the plastic, and/or further cleaning or processing the shredded plastic to remove any remaining contaminants such as paper, glass or any other impurities. The cleaned and shredded plastic may then be melted and extruded in the form of pellets or granules. The pellets or granules of recycled plastics may then be reused to produce the composite materials. An embodiment of a composite material comprising hemp fibers embedded in a matrix of recycled high density polyethylene is shown in FIG. 1. The composite material in FIG. 1 is in the form of a standard tensile strength "dog bone" conforming to the requirements of ASTM D 3039 testing. Tensile testing indicates that the composite material comprising hemp fibers embedded in a matrix of recycled high density polyethylene has a tensile strength of greater than 30 MPa.

The hemp fibers may be processed prior to being incorporated into the matrix of high density polyethylene. For example, the hemp fiber may be physically processed such as, but not limited to, by washing, drying, drying under vacuum and heat, by cleaning, combing, carding, pulping, chopping, weaving, and spinning, for example, and/or chemical processed such as, but not limited to, by steam treatment, alkalization, dyeing, and/or other chemical treatment to provide any desired properties, for example. In certain embodiments, the hemp fibers are cut or chopped. For example, the fibers may be out to have an average length of about 0.5 inches to 2 inches. The hemp fibers may be washed or rinsed with distilled water, deionized water, aqueous solutions or organic solvents, for example. In certain embodiments, the hemp fibers may be washed with distilled water and deionized water before and after chemical treatment and thoroughly dried prior to incorporation into a composite. As used herein, thoroughly dried means that the hemp fibers comprise less than 1% water remaining on their surface by weight.

In further embodiments of the composite material, composite articles and methods, the hemp fibers may be chemically treated with an alkalization process. An alkalization process may clean the fibers and expose the acidic nature of the cellulose of the fibers. In addition, other chemical treatments may be performed to modify the chemical properties of the fibers. For example, chemical modification may modify the properties of the fibers to adhere more closely and strongly with polymeric matrix. In summary, chemically treated hemp fibers may have different properties than untreated hemp fibers. The chemical treatment may be performed with a NaOH solution, for example.

The chemical treatment process, such as, but not limited to, an alkalization process, for hemp fiber has at least three functions. First, the alkalization process will remove or partially remove the non-crystalline structures including pectin, wax, lignin and hemicelluloses from the fiber; therefore more cellulose structure will be exposed for fiber/matrix adhesion. Second, the surface area of hemp fiber may be increased after the treatment. Third, the hydroxyl (—OH) groups on the surface of the fiber may be significantly increased, which will provide more active sites for fiber/matrix interface bonding. Any process that performs produces any of these results may be performed in embodiments of the methods of the producing hemp fiber/HDPE composites.

Other than NaOH, several chemical treatments could also increase the fiber/matrix interface adhesion, including silane, benzoylation, malted coupling agent, etc. For HDPE polymer, treatment with aminopropyltriethoxy silane may produce an increase in the interfacial adherence between the fibers and HDPE matrix. The organo-functional group of silane will cross-link the HDPE backbone, while the silanol molecules will react with the hydroxyl groups (OH$^-$) of the hemp fibre and to form stable covalent links of Si—O-cellulose. The mechanism of using malted coupling agent is similar to the silane group.

Physical treatment of the hemp fibers may further include an orientation process such as carding. The strength of the fibers is in their longitudinal direction and the isotropic or anitropic nature of the properties of an embodiment of the composite material may be designed by controlling the orientation of the fibers in the composite. In certain embodiments, the hemp fibers may have fibers predominantly in a length direction with approximately a 20% cross directional orientation. The orientation of the fibers will affect the properties of the resultant composite. The composite material comprises hemp fiber and high density polyethylene. The composite material may have any desired concentration of hemp fibers in the matrix that produces the desired properties of the composite material. In most embodiments, the composite material will have a composition of hemp fibers between 10% and 60% volume fraction of the composite material. In further embodiments, the composite material will have a composition of hemp fibers between 25% and 55% volume fraction of the composite material; in still further embodiments, the composite material will have a composition of hemp fibers between 30% and 50% volume fraction of the composite material.

In one embodiment, the novel composite material may be used as building and infrastructure material or high-performance structural material. In another embodiment, the novel composite material may be used as a composite material for wood flooring or to produce pallets. In a further embodiment, the novel composite material of the present invention may be used in a variety of application, including packaging, pharmaceutical product packaging, building and infrastructure applications, bridge decking, and in retaining walls to replace the conventional materials, especially the pressured treated lumbers and wood plastic composites.

The composite material is attractive for these applications and others in the market due to its beneficial properties including, but not limited to, high specific strength, insect and fungi resistance, high water and moisture resistance, no violate chemical components or processing, and sustainability. As compared to conventional glass fiber reinforced composites, embodiments of the composite material comprising hemp fibers is reinforced with strong natural fibers. The use of material fibers results in a reduction of the cost and energy consumed to produce the raw materials of the composite material. In addition, the HDPE matrix may be produced from recycled HDPE such as heavy container bottles. The recycled material, which is less expensive than virgin HDPE and also reduces solid waste sent to landfills.

Embodiments include methods of producing composite materials comprising hemp fibers embodied in a matrix of high density polyethylene. Embodiments of the methods include, but are not limited to, vacuum assisted resin transfer methods or pultrusion methods, for example.

Hemp Preparation

Example 1

Composite Material Production by Compression Molding

The hemp fibers were prepared for incorporation into the composite material. Industrial grade hemp fibers were obtained from a commercial available source in Canada. The hemp fibers were approximately 1 inch long and were pre-screened to have an average aspect ratio in the range of 0.0015 to 0.003. The hemp fibers were then chemically processed so the fibers would have improved interfacial strength between the fibers with the HDPE when incorporated into the composite. The hemp fibers were chemically treated with an alkalization process. The alkalization process included: 1) rinsing the fibers with distilled water, 2) then the cleaned fibers were fully submerged in a 20% sodium hydroxide solution for 60 minutes at 25° C., and 3) rinsed and dried at 60° C. for 24 hours.

Recycled High Density Polyethylene

HDPE bottles (labeled with the recycling symbol and a No. 2) were collected, washed and shredded for reuse. The shredded HDPE was melted and extruded through a C.W. Brabender 16-14-000 Extruder operated at 350 RPMs to achieve a substantially homogeneous recycled high density polyethylene resin. The extruded material was shredded through GE laboratory mills to form pellets.

Producing the composite, recycled HDPE pellets were placed into an aluminum mold in a hydraulic hot press (Craver Inc, 40 ton) with the treated hemp fibers. The hemp fibers and the pellets uniformly placed within the mold in layers. The weight ratio of components was controlled at approximately 40% hemp fiber and approximately 60% HDPE. The fibers were oriented predominantly in length direction with approximately 20% of cross directional orientation. After filling the mold, a compression molding process was used to form the composite material. The compression molding process was performed with a nominal compression force of 100 KN for 30 minutes at a temperature of 300° C. The press was cooled with water at a rate of 10° C./minute. After the process, the resulting composite material was removed from the mold.

Figure 2:
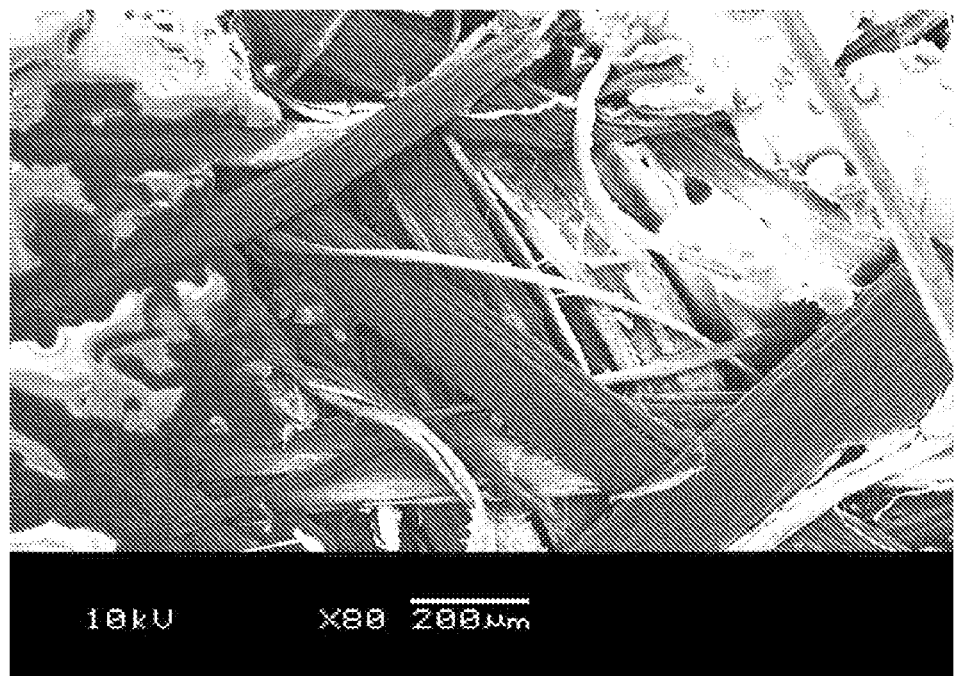
FIG. 2 is a scanning electron microscopic image of the composite material at 80× magnification.
Figure 3:
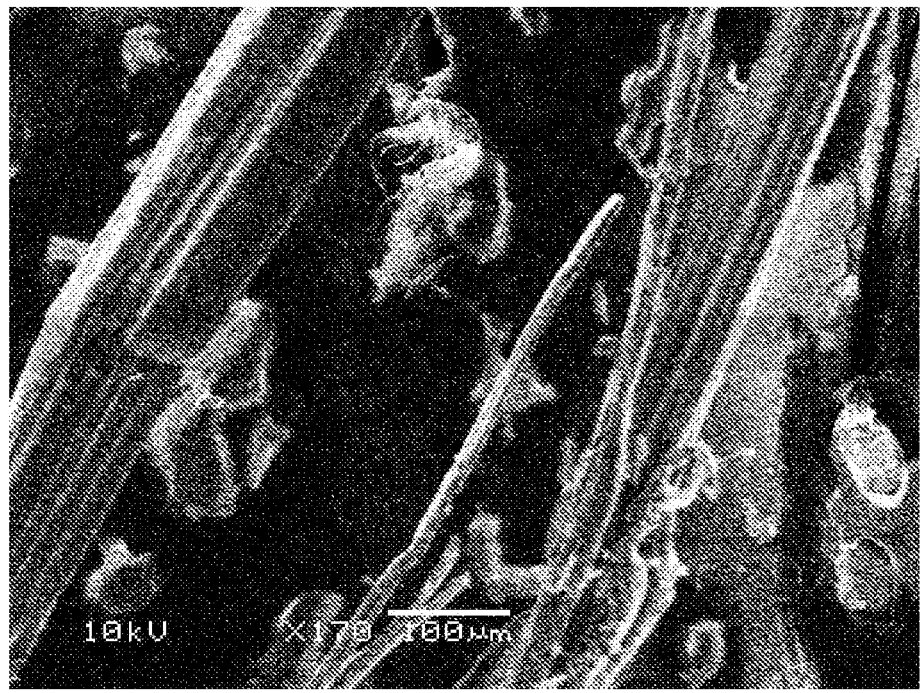
FIG. 3 is a scanning electron microscopic image of the composite material at 170× magnification along the grain.
Figure 4:
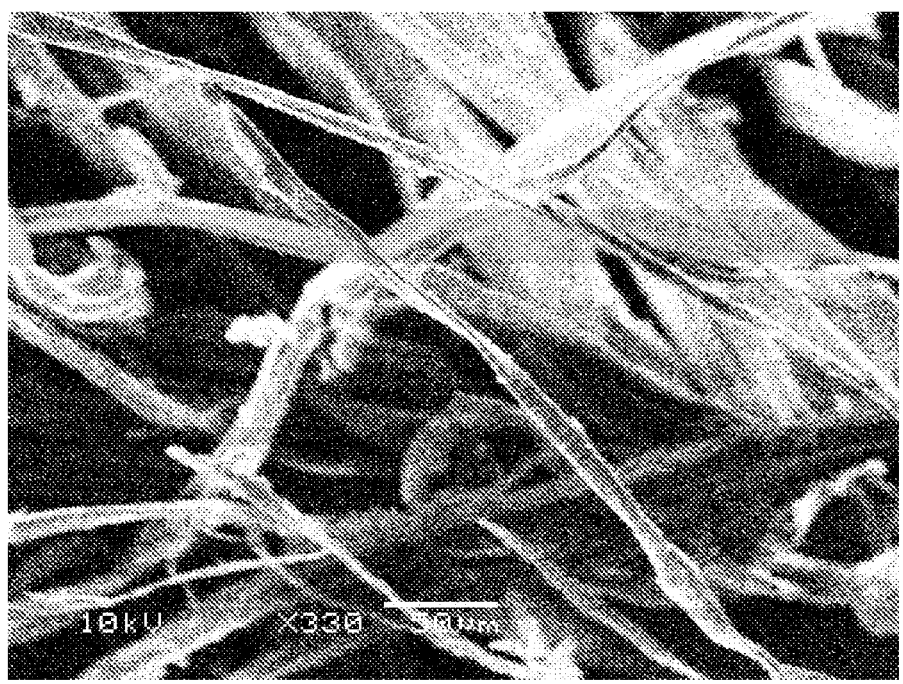
FIG. 4 is a scanning electron microscopic image of the composite material at 330× magnification cross the grain.
Figure 5:
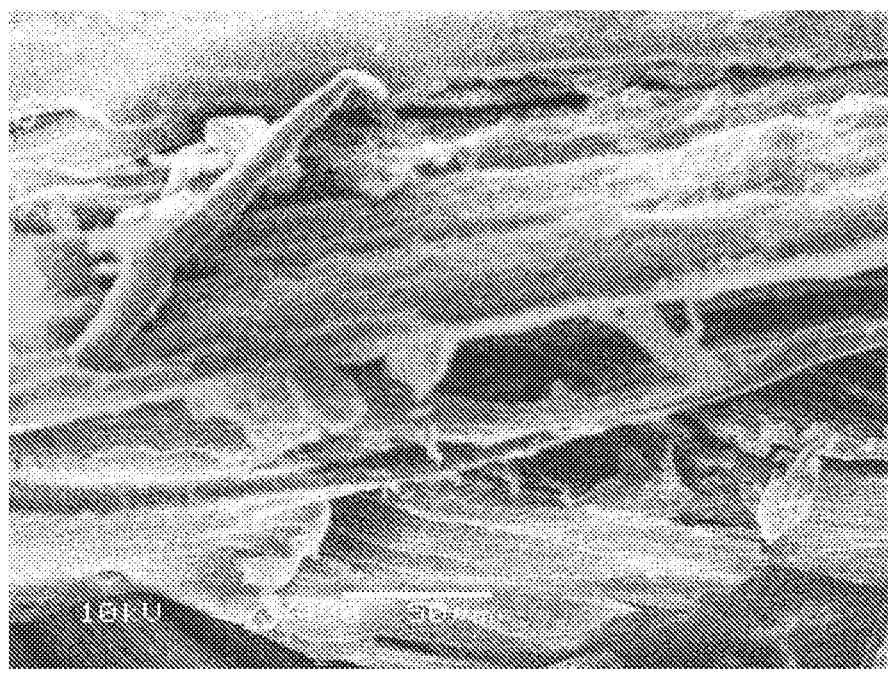
FIG. 5 is a scanning electron microscopic image of a fractured sample of the composite material after tensile testing at 430× magnification cross the grain.
Figure 6:
FIG. 6 is a scanning electron microscopic image of a fractured sample of the composite material after tensile testing at 600× magnification along the grain.
Figure 7:
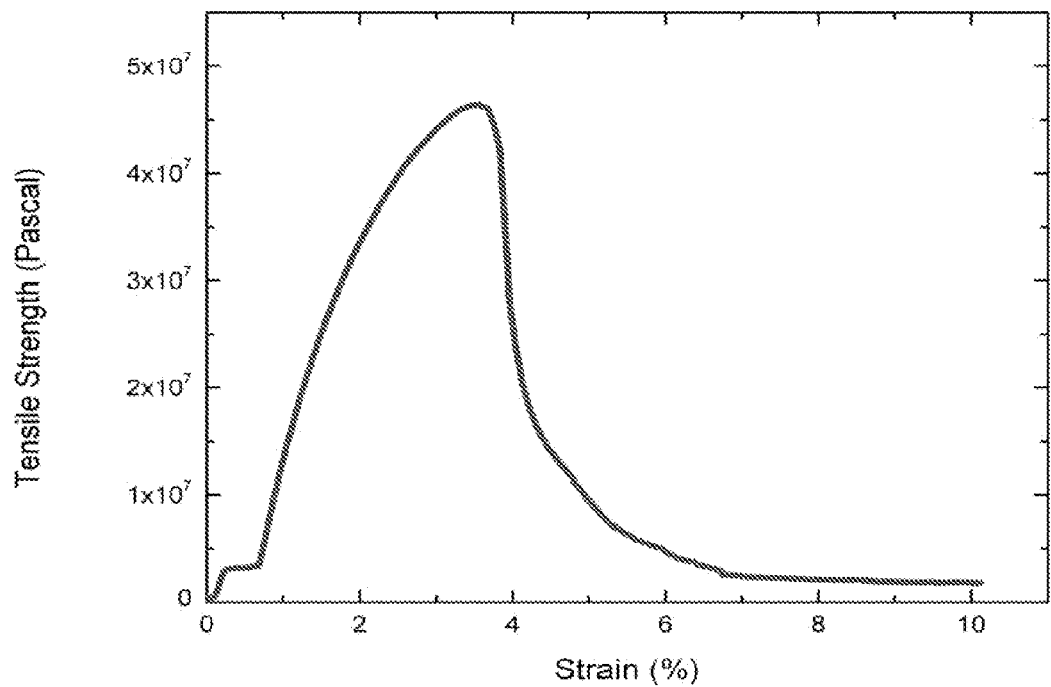
FIG. 7 is a graph of the Strain-Stress curve of composite sample conforming to ASTM D 3039 tensile strength testing standard.

The resulting composite material was cut into specimens for different testing experiments conforming to ASTM standard requirements. Scanning electron microscopy image of the sample before, see FIGS. 2 to 4, and after tensile testing, see FIGS. 5 and 6, were taken to analyze the surface morphology and interface adhesion. All specimens were sputtered with a layer of gold prior to SEM examination. At 200 micron scale, see FIG. 2, the hemp fibers surface affinity and compatibility for polymer composites has shown to be improved by surface treatment. The interfacial adhesion between the hemp fiber with polymer chain has been greatly improved by the chemical processing of the fibers, which led to the superior mechanical stability.

Tensile strength, elongation at break and Young's modulus were determined by the tensile test corresponding to ASTM D 3039 standard. The results indicated that the invented material has maximum strength at 48 MPa and elongation of break at 3.58%.

Example 2

Composite Material Production by Vacuum Assisted Resin Transfer Molding

In one embodiment, the method of forming a composite material includes a vacuum assisted resin transfer molding method. Methods for vacuum assisted resin transfer molding (VARTM) include an infusion process. In the infusion process, a vacuum draws a melted resin into a one-sided mold comprising fibers. A cover, or bag, is placed over the top of the mold to form a vacuum-tight seal. Then the vacuum is applied within the mold, thus drawing the resin into the mold to embed the fibers in resin. This method is also referred to as a vacuum infusion process (VIP) molding.

More specifically, vacuum infusion is a process used for molding fiber composite articles, where distributed fibers are placed in the bottom portion of the mold. The fibers may be in the form of rovings, bands of rovings, or mats. The mats may be woven mats made of single fibers or woven mats made of fiber rovings. As used herein a "roving" is a collection of bundles of continuous filaments or fibers in untwisted strands. A second mold portion, which is typically made of a resilient vacuum bag, is placed on top of the fibers. A vacuum, typically 80 to 90% of the total vacuum, may then be applied to the mold cavity between the bottom portion of the mold and the vacuum bag, the liquid polymer is drawn in and fills the mold cavity thereby embedding the fibers in a matrix of the resin.

The delivery of the resin to the mold can be improved by using a flow enhancement layer or distribution media. The effect of the distribution media is to decrease filling time and improve the resin distribution.

Thus, embodiments of the method of producing a composite material may comprise placing hemp fibers in a vacuum assisted resin transfer mold. The hemp fibers may be in any desired form and may be a blend of hemp fibers and additional synthetic or natural fibers. The hemp fibers, for example, may be in the form of bundles of fiber bands, bands of rovings, mats woven from of single hemp fibers or woven mats made of fiber rovings. The additional fibers may be incorporated in the yarn, roving or mat or added separately from the hemp fibers, for example. The vacuum assisted resin transfer mold may then be covered with a vacuum bag. The hemp fibers (and optional additional fibers) are thus sealed within the mold cavity and the composite article is now ready to be produced by addition of the resin.

The resin is prepared for introduction of the resin. In specific embodiments, the resin comprises a recycled high density polyethylene. The method may comprise heating recycled high density polyethylene into a semi-liquid state above the glass transitional temperature for the recycled high density polyethylene. The heated resin may be drawn into the vacuum assisted resin transfer mold by applying a vacuum to the mold. The resin is drawn into the mold by the vacuum to replace the evacuated gases.

In one embodiment, hemp fibers are twisted into long threads. The threads are then woven into a mat of hemp fibers. The mat of hemp fibers may have a similar geometric structure with fiber glass mat. Second, each layer of hemp fiber was layered on a vacuum bag. Then, recycled HDPE is preheated above the glass transitional temperature into semi-liquid state. The composite could be formed into any desired shape based on the form/shape of vacuum bag. In large scale production, this process could also be easily achieved by using injection molding process.

Example 3

Composite Material Production by Pultrusion

Pultrusion is a continuous low pressured molding process using fiber reinforcements in resins matrices. Typically, the resins are thermosetting resins. The fiber reinforcements are formed into a continuous form and are drawn through a resin bath or injected with resin into the mold. The fibers are drawn through and impregnated with the liquid resin. The fiber is formed to the desired geometric shape and pulled into a heated steel die. Once inside the die, the resin cure is initiated by controlling the composite at elevated temperatures. The composite laminate solidifies in the shape of the die, as it is continuously "pulled" through the die by the Pultrusion machine.

The term pultrusion combines the words, "pull" and "extrusion". Extrusion is the pushing of material, such as a billet of aluminum, through a shaped die. Whereas, pultrusion is the pulling of the material, such as fiberglass and resin, through a shaped die. A typical pultrusion process starts with racks or creels holding rolls of fiber mat or doffs of fiber roving. The raw fiber is pulled off the racks and guided through a resin bath or resin impregnation system. Resin can also be injected directly into the die in some pultrusion systems.

The raw resin may be combined with fillers, catalysts, and pigments. The fiber reinforcement becomes fully impregnated (wetted-out) with the resin such that all the fiber filaments are saturated with the resin mixture. As the resin rich fiber exits the resin impregnation system, the un-cured composite material is pulled through a series of dies. The dies arrange and organize the fiber into a desired shape, while squeezing out excess resin.

Once the resin impregnated fiber is organized and excess resin removed, the composite will pass through a heated steel die. The profile that exits the heated die is a cured pultruded fiber reinforced polymer (FRP) composite. This FRP profile is pulled by a "gripper" system. Either caterpillar tracks or hydraulic clamps are used to pull the composite through the pultrusion die. At the end of this pultrusion machine, the pultruded profiles are cut to the specific length.

Embodiments of a method of producing a composite material may comprise a pultrusion process wherein the fibers comprise hemp fibers. In such embodiments, the resin in the pultrusion process may be high density polyethylene including recycled high density polyethylene. Embodiments of the method include forming a yarn of hemp fibers or a hybrid yarn from hemp fibers and a polymeric fiber. The hemp fibers may be in any desired form and may be a blend of hemp fibers and additional polymeric fibers including synthetic or natural fibers. The hemp fibers, for example, may be in the form of bundles of fiber bands, bands of rovings, mats woven from of single hemp fibers or woven mats made of fiber rovings. The additional fibers may be incorporated in the yarn, roving or mat or added separately from the hemp fibers, for example. The polymeric fibers may comprise polyester or a polylactic acid fibers. In embodiments of the composite material, composite article or the method, the ratio of hemp fibers to polymeric fibers is in the range of about 10:1 to about 1:100. In further embodiments, the ratio of hemp fibers to polymeric fibers is in the range of 1:5 and 1:20.

Embodiments of the method may comprise braiding hemp fiber yarn or the hybrid yarn to form a braided yarn or a braided hybrid yarn. The yarn, braided or unbraided, may then be pultruded with a high density polyethylene resin. The high density polyethylene resin may produced from recycled high density polyethylene.

The yarns may be braided by any desired braiding method. For example, the braided hybrid yarn may be in a tubular shape. In certain embodiments, the method may comprise cutting the tubular braided hybrid yarn open to form an open cut braid and consolidating the hemp and polymeric fibers.

To scale up the hemp fiber composite production for load-bearing structural application, we use the different manufacturing methods by incorporating modern textile techniques.

Figure 8:
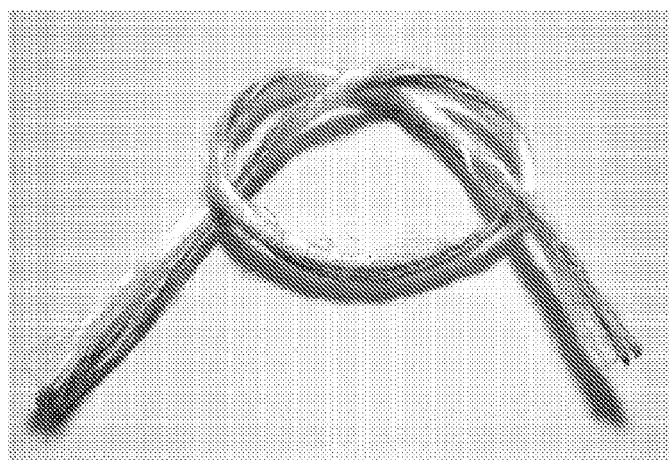
FIG. 8 is an image of a hybrid yarn comprising hemp fibers and polylactic acid fibers for use in a pultrusion process.
Figure 9:
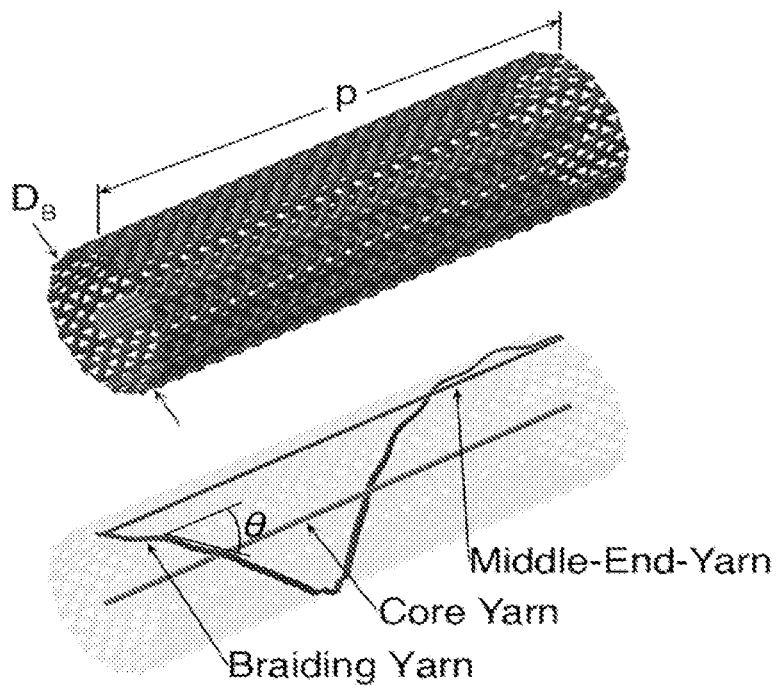
FIG. 9 is a depiction of a braided hybrid yarn comprising hemp fibers and polylactic acid fibers.

Braiding the hemp fiber with pultrusion techniques.
1) Twist hemp fiber with Polyester or polylactic acid (PLA) fibers into yarn, keep the hemp fiber with PLA fiber ratio as 1:10 to form a hybrid yarn. Embodiments of the yarn are shown in FIG. 8.
2) The hybrid yarn consisting of hemp with PLA fiber may be braided by using braiding machine as shown in FIG. 9.

Figures 10A, 10B:
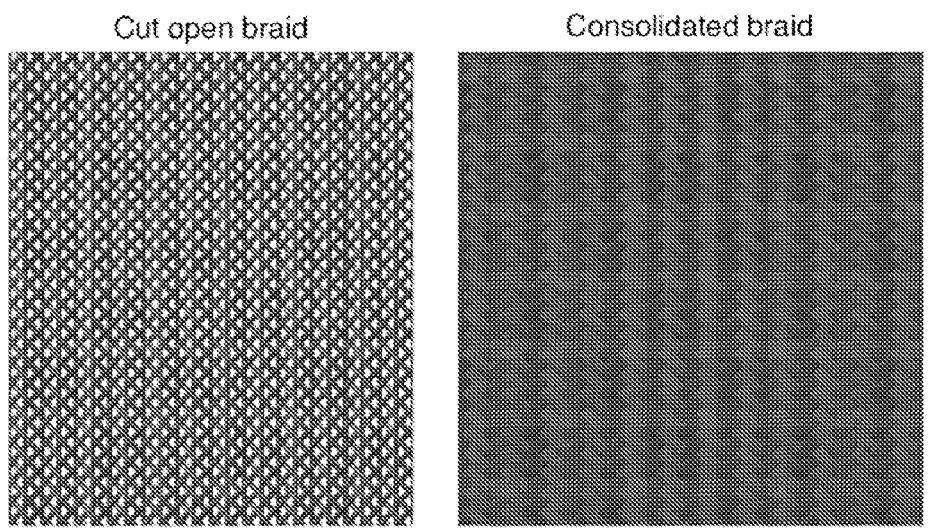
FIG. 10A is a depiction of the braided hybrid yarn of FIG. 9 after it is cut open and laid flat.
FIG. 10B is a depiction of the cut open braided hybrid yarn of FIG. 10A after being consolidated.
Figure 11:
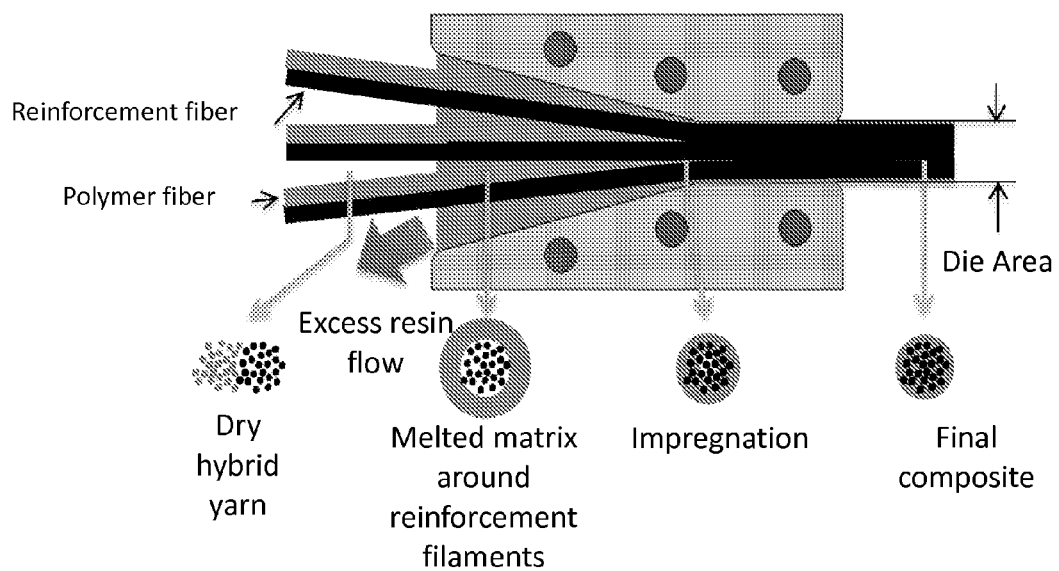
FIG. 11 is a depiction of a pultrusion process using a hybrid yarn (hybrid yarn) and a melted polymer resin to produce a final composite.

3) The braided fiber yarn may be cut open and consolidate as shown in FIG. 10.
4) The open cut braid may be pulled through a pultruder. The final product could be pultruded into any desired shapes with the appropriately designed dies. The schematics of FIG. 11 show the process.

Figure 12:
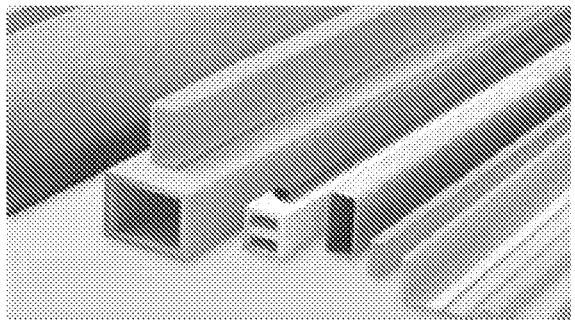
FIG. 12 show various possible embodiments of articles comprising a composite material of hemp fibers embedded in a recycled high density polyethylene matrix that may be formed by a pultrusion process.
Figure 13:
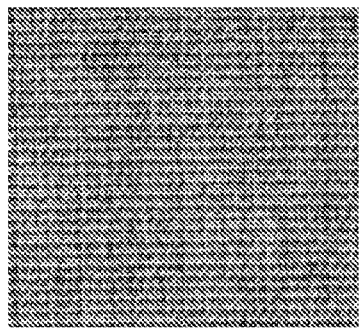
FIG. 13 depicts a mat woven from hemp fibers.
Figure 14:
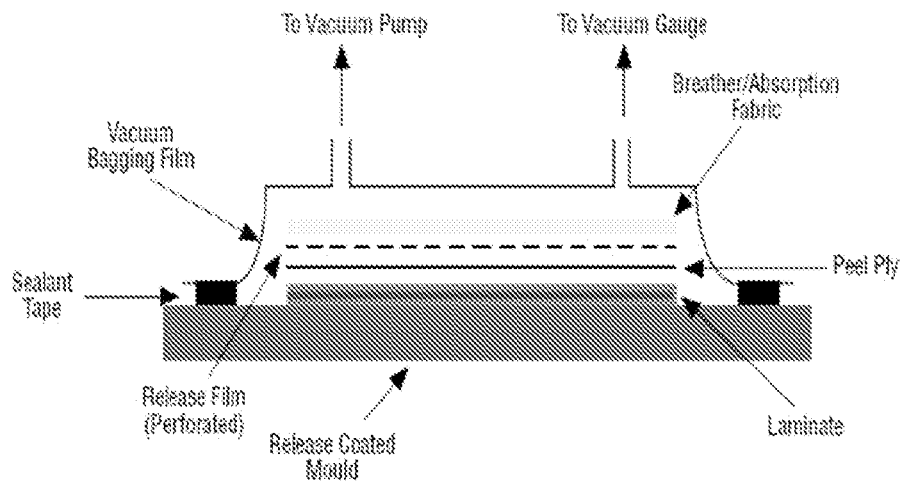
FIG. 14 depicts a vacuum assisted resin transfer process for production of a composite material comprising hemp fibers embedded in a matrix of recycle high density polyethylene.
Figure 15:
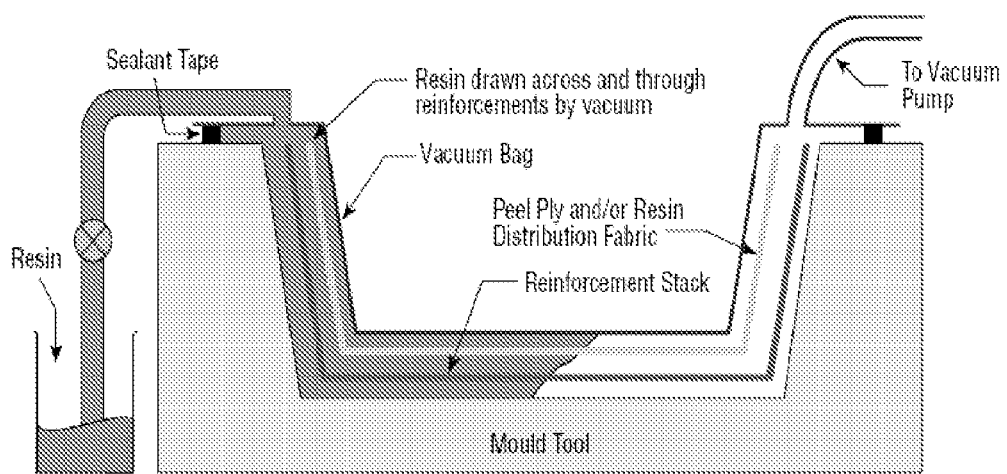
FIG. 15 depicts a vacuum bag assisted resin transfer process for production of a composite material comprising hemp fibers embedded in a matrix of recycle high density polyethylene.

In an embodiment of vacuum assisted resin transfer techniques to form a composite material comprise hemp fiber embedded in a matrix of recycle high density polyethylene the following steps were performed.
1) Using 3D weaving techniques to wave hemp fiber into the mat shape, which has the similar geometric structure with fiber glass mat with much less weight, as the schematic shown in FIG. 12.
2) Laying each layer of hemp fiber on a vacuum bag. Then, we preheat the recycled HDPE into semi-liquid state above the glass transitional temperature, which will impregnate the layered hemp fiber mats by a vacuum pump. The schematic shown in FIGS. 13 and 14 depict an embodiment of the process. The composite could be formed into desired shapes with designed vacuum bags.

Example 4

Comparative Testing

Compression molding techniques were used to synthesize hemp fiber composites with fiber volume fractions of 20%, 30% and 40% respectively for both treated and untreated fibers. Scanning Electron Microscopy (SEM) and Fourier transform infrared spectroscopy (FTIR) were used to investigate the surface morphology of the fiber and the resultant composite. The tensile strength, secant modulus, flexural strength and flexural modulus of the composites having different volume fraction compounds were analyzed.

Materials

Industrial hemp fibers were obtained from Hempline Inc. (Delaware, Ontario, Canada). The average density of Hemp fiber was 0.86 g/cm$^3$ with a typical diameter of 22.5 μm and length of 25 mm. The moisture content of the raw industrial hemp fiber was approximately 6%. The rHDPE pellets used in this study were obtained from Customer Polymer Inc. (Charlotte, N.C., USA) which were recovered from detergent bottle applications, having an average bulk specific density of 0.98 g/cm$^3$, a melt index (MI) of 0.45 g/10 min at 190° C., and a melting temperature range from 130° C. to 190° C.

Composite Manufacturing

For this study the Embodiments of the hemp fiber/rHDPE composites were prepared using both treated and untreated hemp fibers. The treated hemp fibers were prepared using an alkali solution, which contained a 5% concentration of sodium hydroxide (NaOH), prior to the fabrication of the polymeric composites. The hemp fibers were immersed in the NaOH solution for 24 hours at 60° C. to allow complete saturation. After immersion, the hemp fibers were washed with running distilled (DI) water with 1% of acetic acid to neutralize any remaining NaOH molecules. The hemp fibers were then removed from the DI water when their pH level ranged from 6.8 to 7.2 using an Orion 2 Star PH meter. The hemp fibers were then placed in a drying oven at 60° C. for 24 hours. The oven dried hemp fibers were then stored in desiccators prior to being used to manufacture the polymeric composites.

The polymeric composite materials were fabricated by using both a C.W. Brabender 19.05 mm single-screw extruder and Carver hydraulic press. Initially, the pellets of the rHDPE were ground using a laboratory miller manufactured by Arthur Thomas Co, Swedesboro, N.J. The grounded rHDPE powder was then processed into rHDPE films using the single-screw extruder. The extruder was operated at a temperature of 180° C. with an extruder rotational speed of 60 rpm. The films which were extruded had a typical thickness of 0.3 mm and were then cut into a 254 mm×254 mm sheets for use in the composite manufacturing process.

A compression molding technique using the Carver hydraulic press was used to manufacture the hemp fiber composites with the rHDPE films using a fabricated mold [1] having the dimensions of 254 mm×254 mm. Each composite sample was manufactured by sandwiching a layer of manually distributed treated or untreated hemp fiber in between two layers of rHDPE films at a temperature of 180° C. under a constant pressure of 1.5 MPa for duration of 15 minutes. The fibers were placed using a disoriented (random) distribution. These various built up sandwiches were used to fabricate the desired final composites. The weights of hemp fiber and rHDPE layers were controlled to maintain a 20%, 30% or 40% fiber volume fraction. A summary of the composite materials which were manufactured is presented in Table 2. The fiber volume fraction $V_f$ was determined by using the following Equations of [1] and [2]:

$$V_f = (W_f/\rho_f)/(W_m/\rho_m)+(W_f/\rho_f)$$

$$V_m = 1 - V_f \qquad [2]$$

Where $V_f$ denotes the volume fraction of hemp fiber, $W_f$ is the weight of hemp fiber sandwiched in the composite, and $\rho_f$ is the density of hemp fiber. $V_m$, $W_m$, and $\rho_m$ represent the volume fraction, weight, and the density of rHDPE matrix, respectively. Before manufacturing the composite, the weight of fiber and rHDPE for each layer was measured using a Denver Instrument bench-top scale. The density of composite of each composition was measured by displacement methods conforming to ASTM D 792-08[17]. The measured density of each fabricated composite is presented in Table 3

Composite Characterization and Testing

Scanning Electron Microscopic Analysis (SEM)

Surface morphology of the treated and untreated hemp fiber, fiber distribution and the fiber/matrix interface were analyzed by using A JSM-6764 SEM. The SEM specimens were selected from bulk samples of the treated and untreated fibers, and then coated with a thin layer of gold by using a Denton Desk IV sputtering instrument. The SEM instrument was operated at room temperature with 10 kV. The surface morphology of the treated and untreated hemp fiber and the hemp fiber/matrix interface of the rHDPE composites were observed.

Fourier Transform Infrared Spectroscopy Measurement (FTIR)

Chemical compound of untreated and 5% NaOH treated hemp fiber were analyzed using a Perkin-Elmer 100 Spectrometer (Boston, Mass., USA). A total of 8 scans were taken for each sample between 650 cm$^{-1}$ to 4000 cm$^{-1}$, with a resolution of 8 cm$^{-1}$. Each sample was prepared in filament form.

Composite Mechanical Strength

Tensile and flexural testing were conducted using an Instron 5582 constant rate of extension (CRT) universal testing machine in accordance with ASTM D638[18] and D790[19] respectively, under the following test conditions of: i) a cross-head speed of 1.3 mm/min, air temperature 23° C., and iii) 65% relative humidity. For the tensile tests on the various composites manufactured using treated and untreated hemp fibers, the typical tensile stress—strain behavior including analyses of the maximum tensile strength, strain at maximum tensile strength, and the secant modulus at 2 percent (%) strain are presented and reported. For the flexural tests on the various composites manufactured using treated hemp fibers, the typical flexural stress-strain behavior including analyses of the maximum flexural strength, strain at maximum strength, and the flexural modulus at 1 and 3% strain of are presented and reported.

Results

Surface Morphology Results

Figure 16A:
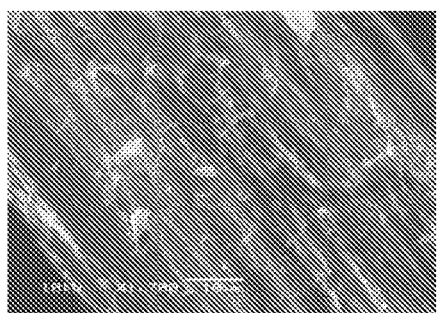
FIG. 16(a) is an SEM image showing the surface morphology of a composite comprising recycled HDPE with untreated hemp fibers.
Figure 16B:
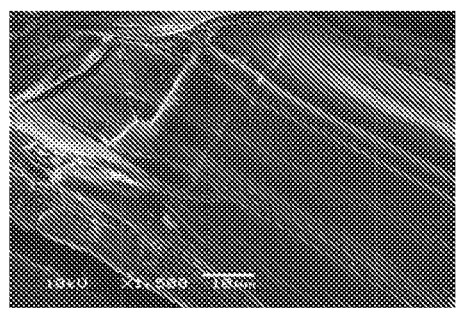
FIG. 16(b) is an SEM image showing the surface morphology of a composite comprising recycled HDPE with 5% NaOH treated hemp fibers.
Figure 16C:
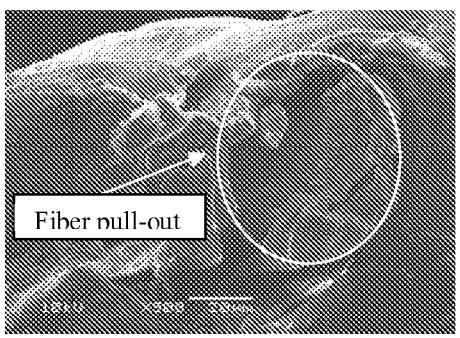
FIG. 16(c) is an SEM image of the fracture surface of a composite with 30% untreated hemp fiber volume fraction showing fiber pull out from the rHDPE matrix.
Figure 16D:
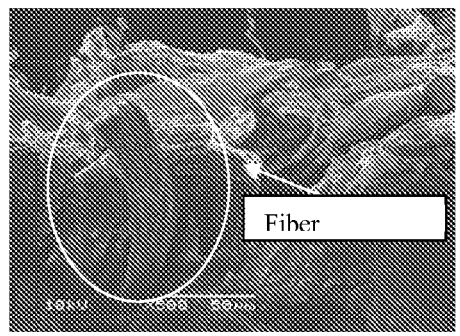
FIG. 16(d) is an SEM image of the fracture surface of a composite with 30% volume fraction of NaOH treated hemp/rHDPE matrix.

FIG. 16(a) is an SEM image showing the surface morphology of a composite comprising recycled HDPE with untreated hemp fibers and FIG. 16(a) is an SEM image showing the surface morphology of a composite comprising recycled HDPE with 5% NaOH treated hemp fibers. A comparison of FIGS. 16(a) and 16(b) reveals significant differences between the surface morphology of treated/untreated hemp fibers. As can be seen in FIG. 16(a), the as-received fiber exhibited smooth non-cellulose structure boundary layers with wax/protein composition and surface impurities. FIG. 16(b) indicated that the alkylation process removed the weak boundary layer of non-cellulose structure, therefore, the surface roughness and surface area of the hemp fiber have been significantly increased, likely resulting in improved interfacial adhesion between fiber and rHDPE matrix. FIG. 16(c) shows the SEM image of the fracture surface of a composite with 30% untreated hemp fiber volume fraction. Fiber pull-out may be observed in the resin rich regions of the composite. This could be attributed to the poor fiber/matrix interface due to the weak surface boundary observed in FIG. 16(a), suggesting that the failure mechanism in the untreated/rHDPE composite could have resulted from de-bonding. On the other hand, FIG. 16(d) presents a typical SEM image of the fracture surface of a composite with 30% volume fraction of NaOH treated hemp/rHDPE matrix. Fiber breakage without pull-out from the matrix was often observed in many areas within the test specimen as shown in FIG. 16(d). This may suggest that there is improved fiber/matrix interface adhesive strength after alkali treatment. Since more fibers break during testing rather than pull out of the matrix the strength of the overall composite is greater.

FTIR Results of NaOH Treated Hemp Fiber

Figure 17:
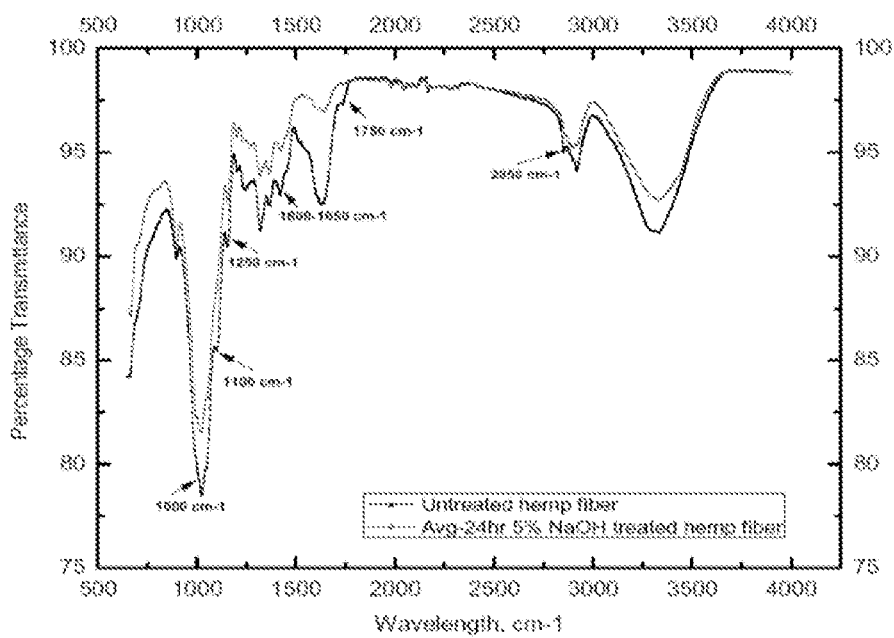
FIG. 17 is a graph of the FTIR spectra for both untreated and treated hemp fiber-, the treated hemp fiber was immersed in 5% NaOH for 24 hours.

FIG. 17 is a graph of the FTIR spectra for both untreated and 5% NaOH treated hemp fiber. The spectra show various transmission bands. After 24 hours of NaOH treatment, the peak at 1000 cm$^{-1}$ (—OH group) is significantly increased with associated hydroxyl group available for fiber/matrix interface bonding. The reaction of hydroxyl bonds with the carboxyl group is given in the range 3200-3600 cm$^{-1}$. The peak in this range has increased after the 24 hour treatment. The similar increases in intensity for both 1000 and 3200-3600 cm$^{-1}$ band in hemp fibers with NaOH treatment have also been reported in previous literature[20]

Compared to untreated fiber, the peak at 1250 cm$^{-1}$ of treated hemp fiber is clearly removed. This peak belongs to the C—O stretching of acetyl groups of lignin. It appears that the lignin is completely removed from the hemp fiber surface after NaOH treatment. Also, the hemicelluloses group is partially removed from the fiber surface after the NaOH treatment as is evident by the decreased carbonyl peak at 1600-1650 cm$^{-1}$ in treated hemp fibers.

The peak at 1740-1750 cm$^{-1}$ in untreated hemp has also been removed after the NaOH treatment. The elimination of this peak was most likely due to the removal of pectin and wax present on the untreated hemp fibers. The peaks observed at 1100 cm$^{-1}$ and 2850 cm$^{-1}$ in untreated fibers also disappeared after treatment. The disappearance of 1100 cm$^{-1}$ peak could be explained by the reaction of NaOH with a secondary alcoholic group, and the peak at 2850 cm$^{-1}$ disappeared after NaOH treatment probably due to the removal of a methane group.

Tensile Strength

The tensile strength of the hemp fiber composites with rHDPE were determined from data obtained in accordance with ASTM D638. The tensile tests were conducted using the standard dog bone shaped test coupon having manufactured dimensions of 12.7 mm in width, 63.5 mm in length and a thickness of 2.5 mm. Five (5) coupons were made from each test sample composite. Table 2 presents a summary of the composite materials which were evaluated which included composites manufactured with treated and untreated fibers.

TABLE 2

Description of the various composite tensile test samples

| Composite Designation | Hemp Fiber Fraction (%) | Polymer Matrix | Polymer Fraction (%) |
| --- | --- | --- | --- |
| rHDPE | 0% of treated hemp | rHDPE | 100 |
| 20uHemp/80rHDPE | 20% of untreated hemp | rHDPE | 80 |
| 20 Hemp/80rHDPE | 20% of treated hemp | rHDPE | 80 |
| 30uHemp/70rHDPE | 30% of untreated hemp | rHDPE | 70 |
| 30 Hemp/70rHDPE | 30% of treated hemp | rHDPE | 70 |
| 40uHemp/60rHDPE | 40% of untreated hemp | rHDPE | 60 |
| 40 Hemp/60rHDPE | 40% of treated hemp | rHDPE | 60 |

Figure 18:
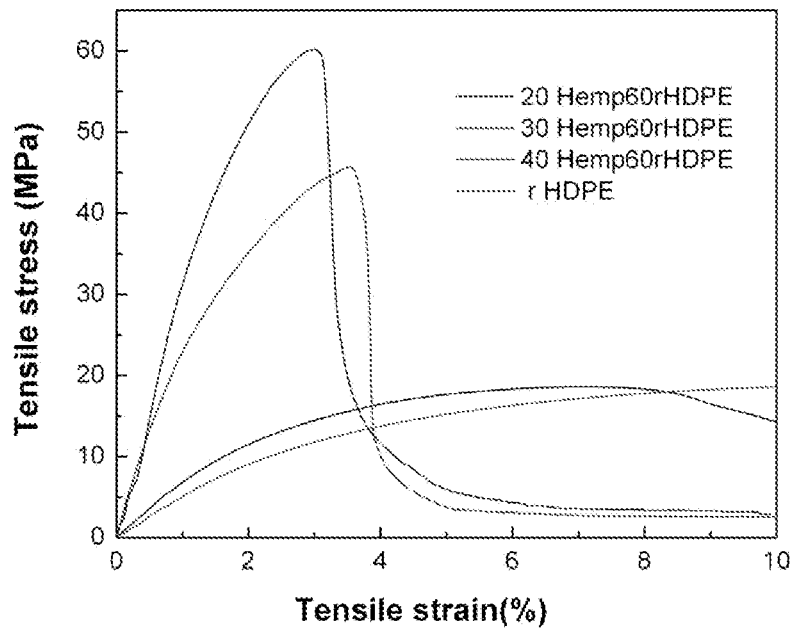
FIG. 18 are graphs of strain-stress curves of hemp fiber composites with different fiber/matrix volume fractions, wherein the hemp fiber composites comprise fibers treated with NaOH.
Figure 19:
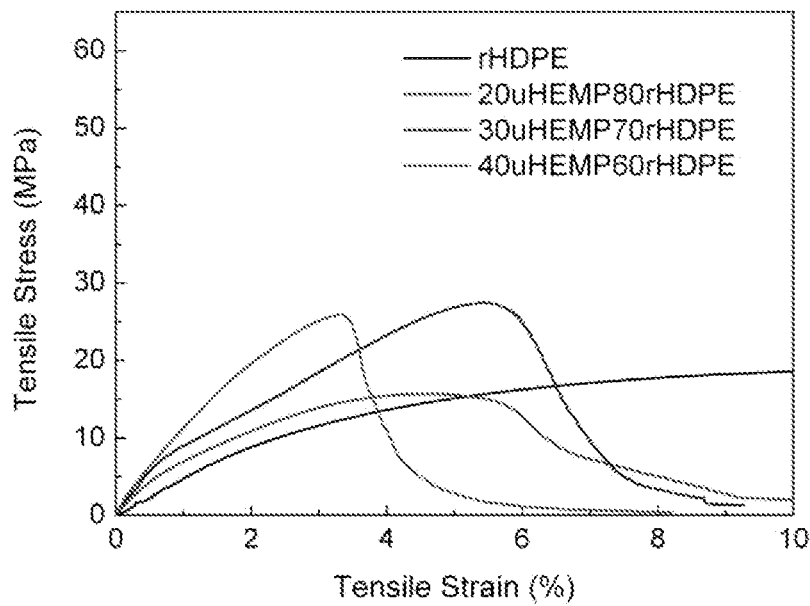
FIG. 19 are graphs of strain-stress curves of hemp fiber composites with different fiber/matrix volume fractions, wherein the hemp fiber composites comprise untreated hemp fibers.
Figure 20:
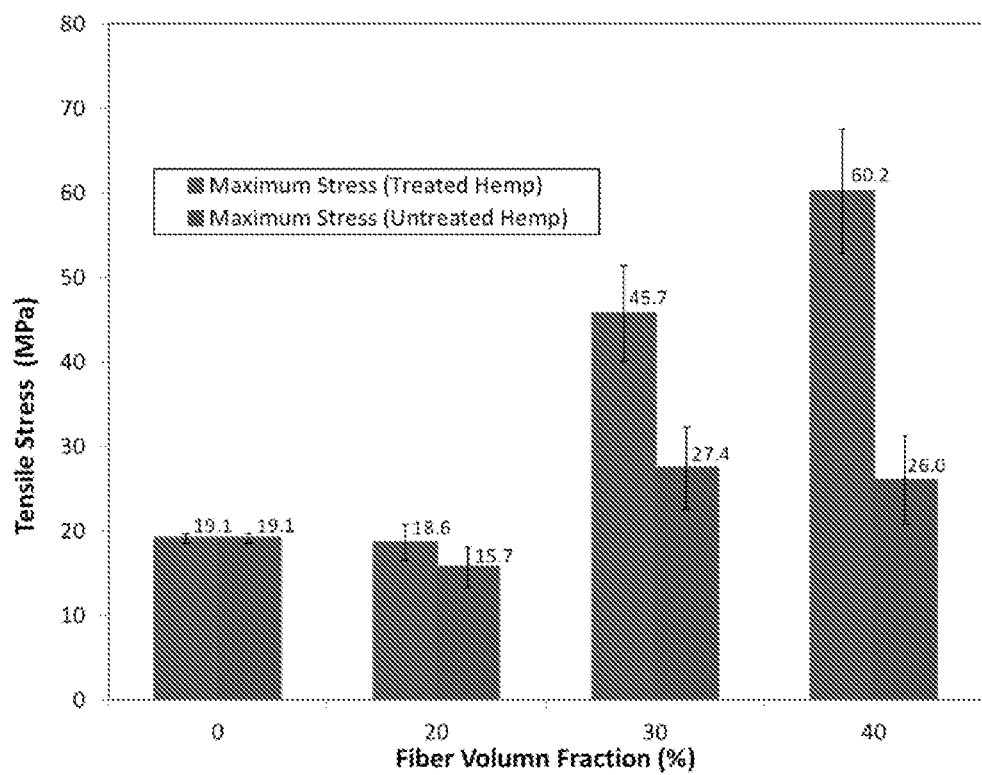
FIG. 20 is a graph of the maximum tensile strength for the treated hemp/rHDPE composite with 40% of fiber volume, the testing demonstrates an approximate three times improvement over the treated hemp composite with 20% of fiber volume fraction, the treated hemp/rHDPE composite with 40% of fiber volume yielded a maximum strength of 60.2 MPa and a strain at maximum strength of 3.0.

Typical strain-stress curves of hemp fiber composites with different fiber/matrix volume fraction are presented in FIG. 18 for treated fiber composites and FIG. 19 for untreated fiber composites. It should be noted that the axial strains were calculated based on the displacement of the CRT's cross-head movement and the initial clamp spacing for each test specimen. A continual improvement in maximum tensile strength and a reduction in strain at maximum strength were observed with the increase in hemp fiber volume fraction for the treated fiber composites. There is a significant improvement in the tensile stress-strain behavior of the treated fiber composites (FIG. 18) compared to the untreated fiber composites (FIG. 19) which may support the findings from the SEM and FTIR which suggests there is improved interfacial adhesion due to the fiber treatment. Overall, the hemp/rHDPE composites were well behaved with regard to their initial stiffness and each had a distinct rupture failure ranging from 3%-7% strain, as can be seen in FIG. 20, the maximum tensile strength for the treated hemp/rHDPE composite with 40% of fiber volume demonstrated an approximate three time improvement from the treated hemp composite with 20% of fiber volume fraction, yielding an maximum strength of 60.2 MPa and a strain at maximum strength of 3.0. The tensile testing results of the treated hemp fiber with recycled HDPE matrix exceeded the previous reported data regarding hemp fiber composites manufactured with virgin Polylactic Acid (PLA) matrix.

Figure 21:
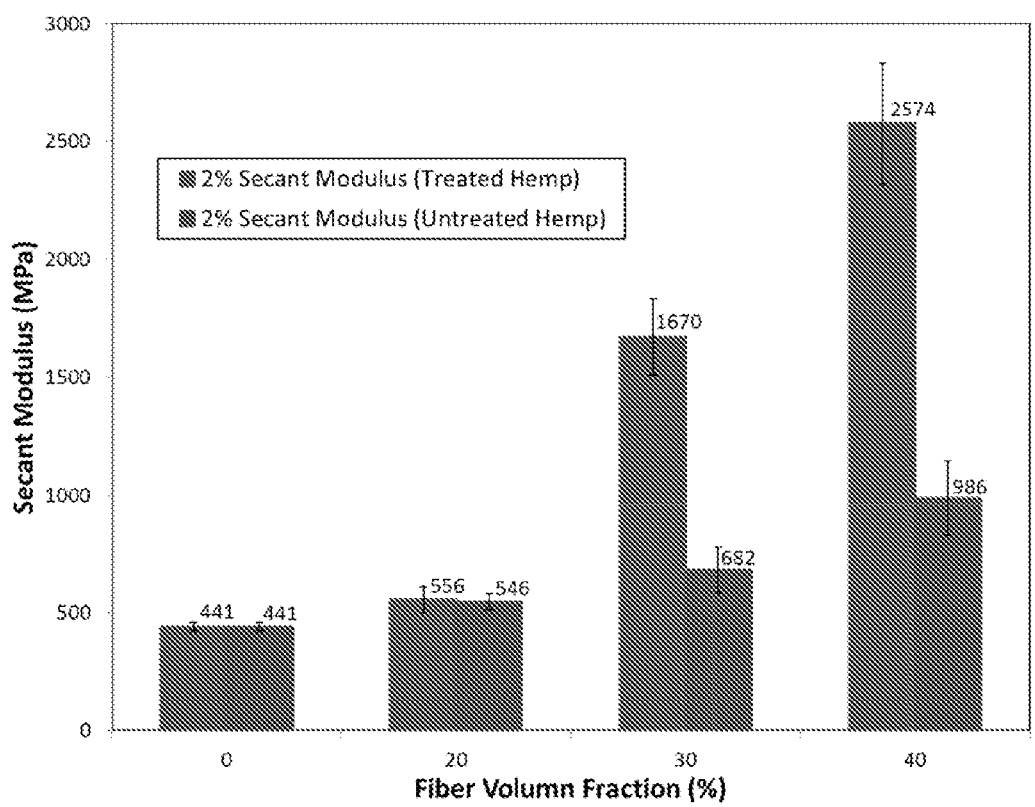
FIG. 21 presents the secant modulus at 2% strain as a function of hemp fiber volume fraction from 20% to 40% for both the treated and untreated composites.

Since these manufactured embodiments of the hemp fiber/rHDPE composites are being considered for their potential use in the civil and building construction sector as possible structural elements there is an interest at understanding their low strain behavior. Due to the nonlinear behavior of the embodiments of the hemp fiber/rHDPE composites, a secant modulus at 2% strain was selected to evaluate the low strain behavior and stiffness. FIG. 21 presents the secant modulus at 2% strain as a function of hemp fiber volume fraction from 20% to 40% for both the treated and untreated composites. There is an observed continuous improvement in the composite stiffness with the increase in fiber volume fraction for the treated fiber composites. The greatest increase in composite stiffness was observed for the 30% hemp fiber volume fraction having an elastic modulus of 1670 MPa as compared to the secant modulus of 556 MPa for the 20% hemp fiber volume fraction. The secant modulus at 2% strain for the treated hemp fiber composite with rHDPE matrix with a 40% fiber volume fraction was 2574 MPa. A summary of the tensile properties of maximum strength, strain at maximum strength, and secant modulus at 2% strain which were measured during this study with their corresponding results for the hemp fiber composites are presented in Table 3.

TABLE 3

Summary of tensile test results for hemp fiber composites

| Composite | Density (g/cc) | Maximum Strength (MPa) | Std. Dev (MPa) | Strain (%) | Secant Modulus at 2% Strain (MPa) | Std. Dev (MPa) |
|---|---|---|---|---|---|---|
| rHDPE | 0.98 | 19.1 | 0.6 | 17.9 | 441 | 18.5 |
| 20uHemp/80rHDPE | 1.00 | 15.7 | 2.4 | 4.5 | 546 | 34.8 |
| 20 Hemp/80rHDPE | 0.95 | 18.6 | 2.1 | 7.0 | 556 | 56.3 |
| 30uHemp/70rHDPE | 1.03 | 27.4 | 4.9 | 5.4 | 682 | 98.4 |
| 30 Hemp/70rHDPE | 0.93 | 45.7 | 5.7 | 3.7 | 1670 | 163.5 |
| 40uHemp/60rHDPE | 1.06 | 26.0 | 5.2 | 3.3 | 986 | 157.9 |
| 40 Hemp/60rHDPE | 0.89 | 60.2 | 7.3 | 3.0 | 2574 | 257.2 |

Flexural Strength

Based on improved tensile strengths of the treated hemp fiber Embodiments of the hemp fiber/rHDPE composites, flexural strength testing was conducted only on composites manufactured from treated hemp fibers. The flexural strength, strain at maximum strength, and flexural modulus at 1% and 3% strain for these Embodiments of the hemp fiber/rHDPE composites materials were tested on the CRT testing machine in accordance with ASTM D790. Each three point flexural bending test was conducted using a rectangular test coupon having typical dimension of 25.4 mm in width, 6.35 mm in thickness and 127 mm in length. Five (5) coupons were made from each test sample composite. The same treated hemp fiber composites which were manufactured for the tensile tests were used for the flexural tests as described in Table 2.

Figure 22:
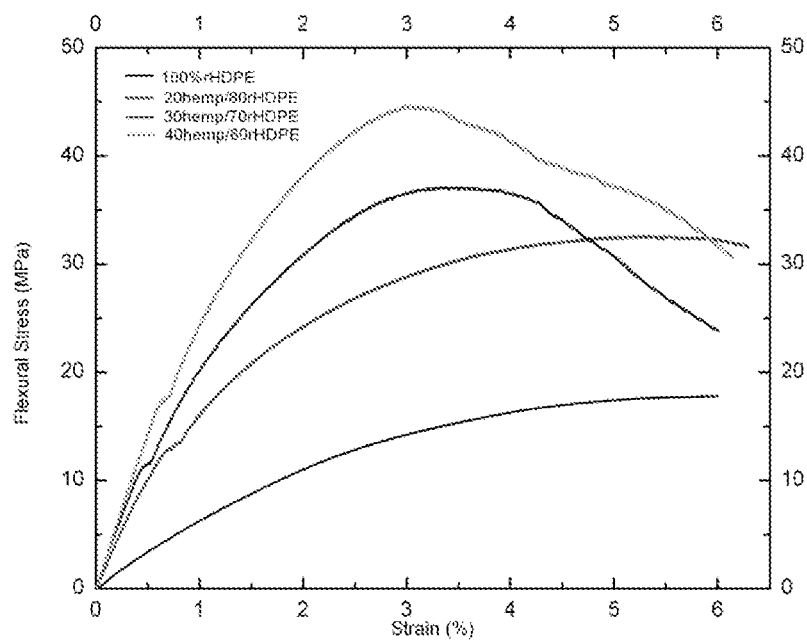
FIG. 22 is a graph of the flexural stress of the treated hemp fibers/rHDPE composites as a function of the flexural strain.
Figure 23:
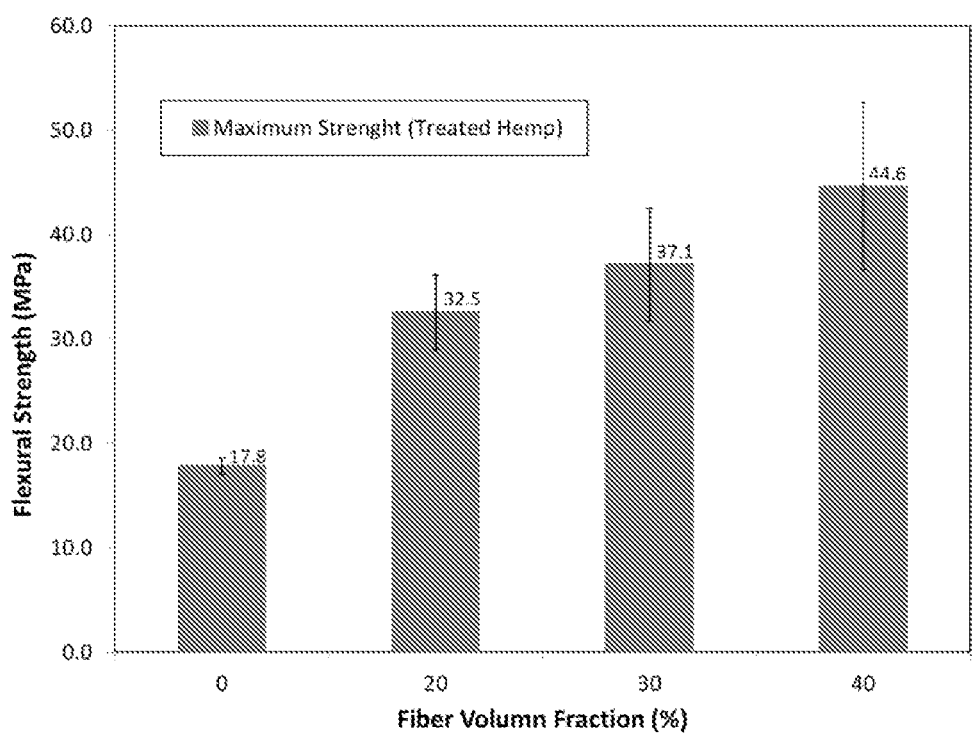
FIG. 23 is a graph of the maximum flexural strength of various embodiments of the composites comprising hemp fibers embedded in a matrix of rHDPE.

FIG. 22 presents the flexural stress of the treated hemp/rHDPE composites as a function of the flexural strain. The flexural strains were calculated based on the procedure provided in ASTM D790 using the displacement of the CRT's cross-head movement. It is interesting to observe that as the fiber fraction increased there was a proportional increase in bending strength and stiffness. The most significant improvement bending strength and stiffness was observed in the higher 40% fiber fraction composite. It can be clearly seen that with an increase in fiber volume fraction there is an increase in the maximum flexural strength as is presented in FIG. 23.

Figure 24:
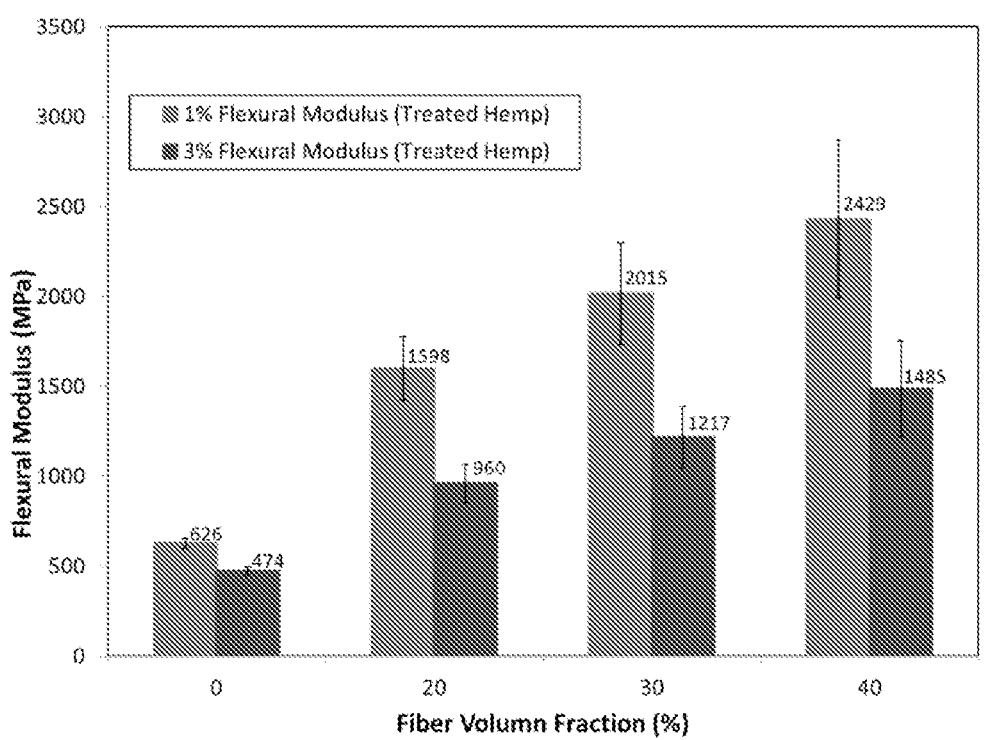
FIG. 24 is a graph of the flexural moduli of the composites with different fiber volume fractions.

Based on the potential use of these manufactured embodiments of the hemp fiber/rHDPE composites in the civil and building construction sector as possible structural elements, there is a further need in understanding their low flexural strain behavior. Due to the more uniform behavior of the embodiments of the hemp fiber/rHDPE composites, the secant modulus at 1% and 3% strain were selected to evaluate the low flexural strain behavior and stiffness. The flexural moduli of the composites with different fiber volume fraction are presented in FIG. 24. The results indicate there is an increase in composite flexural moduli with the increase in fiber volume fraction associated with a corresponding reduction in strain. However, the observed moduli reduce in stiffness as the flexural strain increases. This behavior may be beneficial with regard to absorbing impact loadings that a building structure may incur.

A summary of the flexural strength properties including the maximum flexural strength, strain at maximum strength, and flexural modulus at 1% and 3% flexural strain which were measured during this study with their corresponding results are presented in Table 4.

TABLE 4

Summary of flexural test results for hemp fiber composites

| Composite Designation | Maximum Flexural Strength (MPa) | Std. Dev (MPa) | Strain at Maximum Strength (%) | Flexural Modulus at 1% Strain (MPa) | Std. Dev (MPa) | Flexural Modulus at 3% Strain (MPa) | Std. Dev (MPa) |
|---|---|---|---|---|---|---|---|
| rHDPE | 17.8 | 0.8 | 3.1 | 628 | 27.6 | 474 | 23.7 |
| 20 Hemp/80rHDPE | 32.5 | 3.6 | 3.6 | 1598 | 177 | 960 | 105.6 |
| 30 Hemp/70rHDPE | 37.1 | 5.4 | 5.8 | 2015 | 282.1 | 1217 | 170.4 |
| 40 Hemp/60rHDPE | 44.6 | 8.0 | 6.0 | 2429 | 437.2 | 1485 | 265.8 |

The embodiments of the described method and composite are not limited to the particular embodiments, method steps, and materials disclosed herein as such formulations, process steps, and materials may vary somewhat. Moreover, the terminology employed herein is used for the purpose of describing exemplary embodiments only and the terminology is not intended to be limiting since the scope of the various embodiments of the present invention will be limited only by the appended claims and equivalents thereof.

Therefore, while embodiments of the invention are described with reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all equivalents.

REFERENCES

All Hereby Incorporated Herein by Reference

M. Krouit, M. Belgacem, J. Bras, Composite A 41, 703 (2010)

N. Graupner, A. Herrman, J. Mussig, Composite A 40, 810 (2009)

C. Pattanakul, Journal of Applied Polymer Science, 43(11) 2147 (1999)

A. Thygesen, Properties of hemp fiber polymer composites, Phd Dissertation, Riso National Laboratory, Denmark, (2006)

A. Wibowo, A. Mohanty, M. Misra, L. Drzal, Chopped Industrial hemp fiber reinforced cellulosic plastic biocomposites, Materials and Interfaces, 43, 4883, (2004)

M. Symington, W. Banks, O. West, Tensile testing of cellulose based natural fibers for structural composite applications, Journal of Composite Materials, 43(9), 1083, (2009)

L. Gibson, M. Ashby, Cellulose solids: structure and properties, $1^{st}$ Ed. Oxford: Pergamon Press, (1998)

J. Ganster, H. Fink, Novel cellulose fiber reinforced thermoplastic materials, Cellulose, 13, 271, (2006)

J. Zhao, X. Wang, J. Chang, Y. Yao, Q. Cui, Sound insulation property of word-waste tire rubber composite, Composites Science and Technology, 70, 2033, (2010)

P. Mapleston, Automakers see strong promise in natural fiber composites. Modern Plastics, 73, (1999)

B. Suddell, W. Evans, Natural fiber composites in automotive applications, Natural Fibers, Biopolymers, and biocomposites, $1^{st}$ Ed. Taylor & Francis Group, (2004)

A. Bledzki, O. Faruk, Cars from bio-fibres, Macromolecular Materials and Engineering 291, 449, (2206)

B. Singh, M. Gupta, Natural fiber composites for building applications, Natural Fibers, Biopolymers, and biocomposites, $1^{st}$ Ed. Taylor & Francis Group, (2004)

J. Bodig, B. Jayne, Mechanics of wood and wood composites. New York: Van Nostrand Reinhold, (1982)

M. Islam, K. Pickering and N. Foreman, Influence on alkali treatment on the interfacial and physic-chemical properties of industrial hemp fiber reinforced polylactic acid composites, Composite Part A: Applied Science and Manufacturing, 41, 5 596 (2010)

S. Eichhorn, et al, Journal of Material Science, 36, 2107, (2001)

Mohanty et al, Natural Fibers, Biopolymers and Biocomposites, CRC Press, 41, (2005)

US Environmental Protection Agency: Municipal solid waste in the United States: 2005 facts and figures. USEPA, Municipal and industrial solid waste division, Washington, D.C. (2006)

N. Lu, R. Swan, L. Wang, "Microscopic analysis of hemp fiber reinforced polymeric composite with reclaimed HPDE", 25th Annual Technical Conference of American Society of Composite held jointly with 14th US-Japan Conference on Composite Materials, Dayton, Ohio, 2010

ASTM D792-08, Standard Test Methods for Density and Specific Gravity (Relative Density) of Plastics by Displacement, ASTM International, (2008)

ASTM D 638, Standard Test methods for Tensile Properties of Polymer Matrix Composite Materials, ASTM International, (2008)

ASTM D790, Standard test methods for flexural properties of unreinforced and reinforced plastics and electrical insulating materials, ASTM International, (2010)

L. Y. Mwaikambo and M. P. Ansell, "The Effect of Chemical Treatment on the Properties of Hemp, Sisal, Jute and Kapok for Composite Reinforcement", Angewandte Makromolekulare Chemie, 272, 108, (1999)

R. Hu and JK. Lim, "Fabrication and Mechanical Properties of Completely Biodegradable Hemp Fiber Reinforced Polylactic Acid Composites". Journal of Composite Materials, 41 (13), 1655, (2007)

The invention claimed is:

1. A composite material, comprising:
hemp fibers and additional polymeric fibers braided together and embedded in a matrix of high density polyethylene, wherein the composite material has a tensile strength of greater than 40 MPa, wherein the additional polymeric fibers are at least one of polyester fibers or polylactic acid fibers.

2. The composite material of claim 1, wherein the high density polyethylene is recycled high density polyethylene.

3. The composite material of claim 1, wherein the hemp fibers have an aspect ratio from about 14 to about 28.

4. The composite material of claim 3, wherein the hemp fibers have an average length of about 0.5 inches to 2 inches.

5. The composite material of claim 2, wherein the hemp fibers were chemically treated with an alkalization process.

6. The composite material of claim 2, wherein the hemp fibers have the properties of hemp fibers that were chemically treated with an alkalization process.

7. The composite material of claim 2, wherein the hemp fibers have a fiber orientation are arranged predominantly in a length direction with approximately a 20% cross directional orientation.

8. The composite material of claim 1, wherein the composite material has a hemp fiber volume percentage between 25% and 55%.

9. The composite material of claim 1, wherein the composite material has a composition of hemp fibers between 10% volume fraction and 60% volume fraction of the composite material.

10. The composite material of claim 1, wherein pecitin, wax and lignin were removed from the hemp fiber surface.

11. The composite material of claim 1, wherein the hemp fiber is treated hemp fiber and non-crystalline structures including pectin, wax, lignin and hemicelluloses have been at least partially removed from the hemp fiber thereby exposing more cellulose structure for fiber/matrix adhesion; a surface area of the treated hemp fiber is greater than a surface area of an untreated hemp fiber; and the number of hydroxyl groups on the surface of the treated hemp fiber is significantly more than an untreated hemp fiber thereby providing more active sites for fiber/matrix interface bonding.

12. The composite material of claim 1, wherein the ratio of the hemp fibers to the additional polymeric fibers is in the range of about 10:1 to about 1:100.

13. The composite material of claim 12, wherein the ratio of the hemp fibers to the additional polymeric fibers is in the range of 1:5 and 1:20.

* * * * *